United States Patent
Eberlein et al.

(10) Patent No.: US 11,030,164 B2
(45) Date of Patent: Jun. 8, 2021

(54) ARTIFACT DEPLOYMENT FOR APPLICATION MANAGED SERVICE INSTANCES

(71) Applicant: SAP SE, Walldorf (DE)

(72) Inventors: Peter Eberlein, Malsch (DE); Klaus Kopecz, Walldorf (DE); Arne Harren, Walldorf (DE)

(73) Assignee: SAP SE, Walldorf (DE)

( * ) Notice: Subject to any disclaimer, the term of this patent is extended or adjusted under 35 U.S.C. 154(b) by 537 days.

(21) Appl. No.: 15/874,317

(22) Filed: Jan. 18, 2018

(65) Prior Publication Data
US 2019/0220529 A1    Jul. 18, 2019

(51) Int. Cl.
| | |
|---|---|
| G06F 16/21 | (2019.01) |
| G06F 8/60 | (2018.01) |
| G06F 16/25 | (2019.01) |
| G06F 8/71 | (2018.01) |
| H04L 29/08 | (2006.01) |

(52) U.S. Cl.
CPC .............. *G06F 16/211* (2019.01); *G06F 8/60* (2013.01); *G06F 8/71* (2013.01); *G06F 16/252* (2019.01); *H04L 67/10* (2013.01)

(58) Field of Classification Search
CPC . G06F 8/60; G06F 8/71; G06F 16/211; G06F 16/252; H04L 67/10
See application file for complete search history.

(56) References Cited

U.S. PATENT DOCUMENTS

| | | | |
|---|---|---|---|
| 7,124,148 B2 | 10/2006 | Sauermann | |
| 7,222,308 B2 | 5/2007 | Sauermann et al. | |
| 7,231,387 B2 | 6/2007 | Sauermann et al. | |
| 7,257,599 B2 | 8/2007 | Sauermann et al. | |
| 7,310,719 B2 | 12/2007 | Von Bergen et al. | |
| 7,337,295 B2 | 2/2008 | Von Bergen et al. | |
| 7,373,340 B2 | 5/2008 | Sauermann et al. | |
| 7,403,495 B2 | 7/2008 | Sauermann | |
| 7,415,458 B2 | 8/2008 | Sauermann | |
| 7,447,987 B2 | 11/2008 | Sauermann | |
| 7,454,454 B2 | 11/2008 | Sauermann | |
| 7,487,165 B2 | 2/2009 | Sauermann et al. | |
| 7,523,142 B2 | 4/2009 | Driesen et al. | |
| 7,574,676 B2 | 8/2009 | Sauermann | |
| 7,590,683 B2 | 9/2009 | Bergen et al. | |
| 7,610,582 B2 | 10/2009 | Becker et al. | |
| 7,647,592 B2 | 1/2010 | Sauermann | |

(Continued)

OTHER PUBLICATIONS

U.S. Appl. No. 14/960,983, Eberlein, et al., filed Dec. 7, 2015.

(Continued)

*Primary Examiner* — Ken Hoang
(74) *Attorney, Agent, or Firm* — Fish & Richardson P.C.

(57) ABSTRACT

A first instance of a deployer application is executed in a server mode. The deployer application is configured to deploy service instances for a multi-tenant application. A first onboarding request is received for a first tenant for the multi-tenant application. A first service instance for the first tenant is created, in response to the first onboarding request. A first request to deploy artifacts to the first service instance is received, by the first instance of the deployer application. The artifacts are deployed, by the first instance of the deployer application, to the first service instance.

17 Claims, 5 Drawing Sheets

(56) References Cited

U.S. PATENT DOCUMENTS

| | | |
|---|---|---|
| 7,653,452 B2 | 1/2010 | Sauermann et al. |
| 7,653,902 B2 | 1/2010 | Bozak |
| 7,657,575 B2 | 2/2010 | Eberlein et al. |
| 7,664,858 B2 | 2/2010 | Sauermann |
| 7,665,030 B2 | 2/2010 | Sauermann et al. |
| 7,685,510 B2 | 3/2010 | Sauermann |
| 7,720,992 B2 | 5/2010 | Brendle et al. |
| 7,725,900 B2 | 5/2010 | Sauermann |
| 7,730,053 B2 | 6/2010 | Sauermann |
| 7,734,648 B2 | 6/2010 | Eberlein |
| 7,739,387 B2 | 6/2010 | Eberlein et al. |
| 7,752,067 B2 | 7/2010 | Fotteler et al. |
| 7,752,628 B2 | 7/2010 | Sauermann |
| 7,788,124 B2 | 8/2010 | Fotteler et al. |
| 7,797,286 B2 | 9/2010 | Sauermann |
| 7,873,666 B2 | 1/2011 | Sauermann |
| 7,894,602 B2 | 2/2011 | Mueller et al. |
| 7,900,155 B2 | 3/2011 | Sauermann |
| 7,962,920 B2 | 6/2011 | Gabriel et al. |
| 7,971,209 B2 | 6/2011 | Eberlein et al. |
| 8,074,206 B2 | 12/2011 | Sauermann et al. |
| 8,078,985 B2 | 12/2011 | Sauermann |
| 8,108,798 B2 | 1/2012 | Sauermann |
| 8,126,919 B2 | 2/2012 | Eberlein |
| 8,171,422 B2 | 5/2012 | Sauermann |
| 8,200,634 B2 | 6/2012 | Driesen et al. |
| 8,203,972 B2 | 6/2012 | Sauermann |
| 8,224,938 B2 | 7/2012 | Sauermann |
| 8,225,303 B2 | 7/2012 | Wagner et al. |
| 8,250,135 B2 | 8/2012 | Driesen et al. |
| 8,285,584 B2 | 10/2012 | Fotteler et al. |
| 8,291,038 B2 | 10/2012 | Driesen |
| 8,301,610 B2 | 10/2012 | Driesen et al. |
| 8,302,160 B2 | 10/2012 | Hofmann et al. |
| 8,316,422 B2 | 11/2012 | Hofmann et al. |
| 8,321,678 B2 | 11/2012 | Hofmann et al. |
| 8,356,010 B2 | 1/2013 | Driesen |
| 8,370,184 B2 | 2/2013 | Fotteler et al. |
| 8,370,185 B2 | 2/2013 | Fotteler et al. |
| 8,375,130 B2 | 2/2013 | Eberlein et al. |
| 8,380,667 B2 | 2/2013 | Driesen |
| 8,392,231 B2 | 3/2013 | Fotteler et al. |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,510,710 B2 | 8/2013 | Harren et al. |
| 8,543,994 B2 | 9/2013 | de Boer et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,621,385 B2 | 12/2013 | Sauermann et al. |
| 8,639,548 B2 | 1/2014 | Fotteler et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,769,704 B2 | 7/2014 | Peddada et al. |
| 8,793,230 B2 | 7/2014 | Engelko et al. |
| 8,805,986 B2 | 8/2014 | Driesen et al. |
| 8,812,554 B1 | 8/2014 | Boulanov |
| 8,868,582 B2 | 10/2014 | Fitzer et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,930,413 B2 | 1/2015 | Tang et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,525 B2 | 5/2015 | Harren et al. |
| 9,026,857 B2 | 5/2015 | Becker et al. |
| 9,031,910 B2 | 5/2015 | Driesen |
| 9,032,406 B2 | 5/2015 | Eberlein |
| 9,047,105 B2 | 6/2015 | Kinder et al. |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,275,120 B2 | 6/2016 | Mayer et al. |
| 9,600,269 B1 | 3/2017 | Bregler et al. |
| 9,724,757 B2 | 8/2017 | Barrett |
| 10,212,050 B2 * | 2/2019 | Gupte .................. G06F 16/211 |
| 2005/0055331 A1 | 3/2005 | Sauermann et al. |
| 2007/0250575 A1 | 10/2007 | Tseltlin |
| 2008/0120129 A1 | 5/2008 | Seubert et al. |
| 2009/0265314 A1 | 10/2009 | Kindsvogel et al. |
| 2010/0042986 A1 | 2/2010 | Greiner |
| 2010/0153341 A1 | 6/2010 | Driesen et al. |
| 2010/0161648 A1 | 6/2010 | Eberlein et al. |
| 2013/0132349 A1 | 5/2013 | Hahn et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0074793 A1* | 3/2014 | Doering ................ G06F 16/113 |
| | | 707/667 |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0215385 A1 | 7/2014 | Sauermann |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0006730 A1 | 1/2015 | Helfman et al. |
| 2015/0007126 A1 | 1/2015 | Koutyrine et al. |
| 2015/0100546 A1 | 4/2015 | Eberlein et al. |
| 2015/0178332 A1 | 6/2015 | Said et al. |
| 2016/0105488 A1* | 4/2016 | Thakkar .............. H04L 12/4641 |
| | | 709/217 |
| 2017/0025441 A1 | 1/2017 | Mori |
| 2017/0060557 A1 | 3/2017 | Bendelac et al. |

OTHER PUBLICATIONS

U.S. Appl. No. 15/083,918, Eberlein, et al., filed Mar. 29, 2016.
U.S. Appl. No. 15/087,677, Eberlein, et al., filed Mar. 31, 2016.
U.S. Appl. No. 15/356,190, Eberlein, Peter, filed Nov. 18, 2016.
U.S. Appl. No. 15/581,459, Eberlein, et al., filed Apr. 28, 2017.
U.S. Appl. No. 15/593,830, Eberlein, et al., filed May 12, 2017.
U.S. Appl. No. 15/637,531, Bregler, et al., filed Jun. 29, 2017.
U.S. Appl. No. 15/637,554, Bregler, et al., filed Jun. 29, 2017.
U.S. Appl. No. 15/637,601, Bregler, et al., filed Jun. 29, 2017.
U.S. Appl. No. 15/637,698, Bregler, et al., filed Jun. 29, 2017.
U.S. Appl. No. 15/824,041, Bregler, et al., filed Nov. 28, 2017.

* cited by examiner

FIG. 3

```
_schema-version: '2.0'
_ID: app
version: 1.0.0
modules:
 - name: node1                                              # provides the onboarding callback
   type: nodejs
   path: node1
   requires:
    - name: instance-manager-for-instance-hdi-containers
    - name: instance-deploy-server-api
      properties:
       INSTANCE_DEPLOY_SERVER_URL: ~{url}                   # wiring of REST API endpoint
 - name: node2
   type: nodejs
   path: node2
   requires:
    - name: static-hdi-container
    - name: instance-manager-for-instance-hdi-containers
 - name: db
   type: hdb
   path: db
   requires:
    - name: static-hdi-container
 - name: instance_db
   type: nodejs
   path: instance_db
   provides:
    - name: instance-deploy-server-api
      properties:
       url: ${default-url}                                  # exposure of REST API endpoint
resources:
 - name: static-hdi-container
   type: com.corp.xs.hdi-container
 - name: instance-manager-for-instance-hdi-containers
   type: com.corp.xs.managed-hdi-container
```

- 302 → App w/ Tenant Onboarding Callback 303 Handling
- 320 → App 322
- 312 → Deployer App (One-Off Module) (db Module) 314
- 310 → Deployer App "--instance-deploy-server" 308
- 318 → Main Container (Static) 316
- 306 → Instance Manager for Containers 304

300

ARTIFACT DEPLOYMENT FOR APPLICATION MANAGED SERVICE INSTANCES

BACKGROUND

Microservice-oriented application platforms (for example, XS ADVANCED or underlying CLOUD FOUNDARY platform as a service (PaaS)) manage services as resources that are instantiated and statically-bound at deployment time by an application operator. This is an appropriate model for applications that only require a fixed number of instances of a particular type, such as a schema in a database. However, for multiple-tenancy-capable applications that leverage service instances for tenant separation (for example, each tenant stores its data in a separate schema), static binding is not sufficient. Such applications need to create additional instances at runtime whenever a new tenant is added and also need to connect to any one of these instances when processing a request for a specific tenant.

SUMMARY

The present disclosure describes artifact deployment for application managed service instances.

In an implementation, a first instance of a deployer application is executed in a server mode. The deployer application is configured to deploy service instances for a multi-tenant application. A first onboarding request is received for a first tenant for the multi-tenant application. A first service instance for the first tenant is created, in response to the first onboarding request. A first request to deploy artifacts to the first service instance is received, by the first instance of the deployer application. The artifacts are deployed, by the first instance of the deployer application, to the first service instance.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, a server instance of a deployer application can be started in a server mode and listen for requests to deploy artifacts for a new service instance for a new onboarded tenant. Second, a deployer application can support both run-once and server modes. Third, application deployment can be decoupled from deployment of design-time artifacts for new service instances for newly-onboarded tenants. Fourth, similar database modules can be used to deploy both tenant-specific and tenant-independent content. Fifth, if a certain tenant requires extensions to previously deployed artifacts (for example, an additional field in a database table), the deployer application can be called to deploy such extension artifacts.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 3 is an example descriptor file that describes modules associated with a multi-tenant application, according to an implementation of the present disclosure.

Like reference numbers and designations in the various drawings indicate like elements.

DETAILED DESCRIPTION

Figure 1:
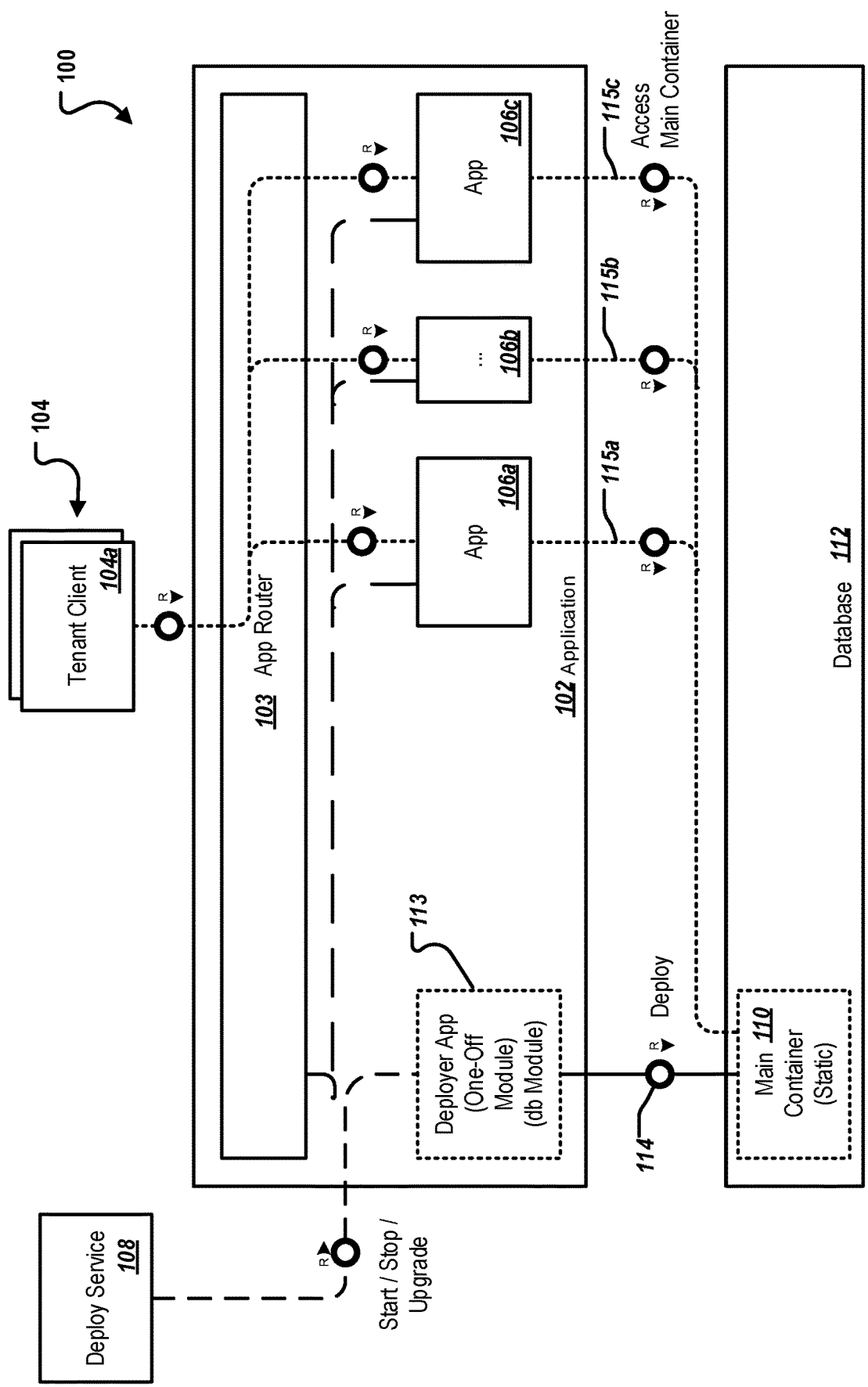
FIG. 1 is a block diagram illustrating an example of a system for deploying content for a static service instance, according to an implementation of the present disclosure.

The following detailed description describes artifact deployment for application managed service instances, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Microservice-oriented application platforms (for example, XS ADVANCED or underlying CLOUD FOUNDARY platform as a service (PaaS)) manage services as resources that are instantiated and statically-bound at deployment time by an application operator. This is an appropriate model for applications that only require a fixed number of instances (typically one) of a particular type, such as a schema in a database. However, for multiple-tenancy-capable applications that leverage service instances for tenant separation (for example, each tenant stores its data in a separate schema), static binding is not sufficient. Such applications need to create additional instances at runtime whenever a new tenant is added and also need to connect to any one of these instances when processing a request for a specific tenant.

Because users expect a rich, interactive, and dynamic experience, an online- or network-available, multi-tenant application is generally scalable, has minimal downtime, and is cloud-computing-environment enabled. In a microservices architecture (MSA), an application is typically split into a number of individually-deployable, narrowly-focused, re-usable, fault-tolerant software services organized around capabilities (for example, a database persistence service, email sending service, job scheduling service, and user interface management service). Services can be implemented (for example, in various software/hardware environments, databases, or programming languages) as an interface is used to call particular services. As a change to a small part of the application requires only one or a small number of services to be rebuilt and to be redeployed, a MSA application is naturally modular and allows for a more continuous-delivery-type of software development process.

A service binding (for example, a set of key/value pairs containing a service URL (Uniform Resource Locator) and access credentials) is normally used by a particular application to make the application aware of data/interface requirements needed to interact with each of the various services. MSA application platforms can manage services as resources that are instantiated and bound at deployment time by a deployer (for example, a third-party or application developer/administrator). This is an appropriate model for applications that only require a fixed number of service instances (typically one) of a particular type, such as a schema in a database.

However, for applications that leverage separation of service instances for a tenant (for example, each tenant stores its data in a separate database schema), this type of static binding is not sufficient. Such applications need to be able to create additional service instances dynamically at runtime whenever a new tenant is added (or onboarded) to a cloud-computing-type environment and also need to connect to any one of these service instances when processing a request applicable to a specific tenant. When a new tenant subscribes to an application, the application is made aware by an onboarding process that the tenant is new and the application receives a chance to prepare provision of its services to the tenant.

In order to provide for these requirements, an instance manager component can be used. The instance manager can expose an application programming interface (API) that is accessible by an application using a service binding to an instance manager instance to create actual service instances or to retrieve credentials to a specific service instance that the instance manager manages (for example, during onboarding, the application can make a request to a service instance of the instance manager to dynamically create one or more service instances). The instance manager can build on functionality of a service broker that handles static instance creation and binding by providing applications with an ability to also dynamically manage service instances.

When an application is started, the application can receive credentials for an instance manager instance, rather than for an actual service instance. With these credentials, the application can invoke services provided by the instance manager for creating new actual service instances whenever a new tenant is added to the application. When a tenant uses the application and access to an actual service instance is required, the application can invoke another service of the instance manager that dynamically returns the credentials to the tenant's actual service instance based, for example, on a tenant identifier that can be provided when the service instance was originally created. With the returned credentials, the application can then connect to actual service instances, dynamically switching between available service instances as required for processing requests for specific tenants. In typical implementations, service instance credentials can be cached and open connections can be pooled to minimize overhead created by additional calls to the instance manager.

With a multi-tenancy application, each tenant may have a different database schema. When a new tenant onboards to the system, a new schema can be created, at runtime, by the instance manager. When the new tenant onboards, a new, empty container can be created for the new tenant. The empty container does not initially have database structures or artifacts such as tables, views, or stored procedures. Artifacts can be dynamically created in the newly created container, after a schema has been created in the database container.

A deployer application can be configured to support two modes. An instance of the deployer application can be executed in a one-off mode to deploy a static container. The deployer application instance that is executed in the one-off mode can terminate after the static container has been deployed. Another instance of the deployer application can be executed in a server mode, for continual execution, for creation of artifacts in database containers that have been dynamically created for new tenants. An application can, after a schema for a new tenant has been created by the instance manager, invoke the server instance of the deployer application for creation of artifacts in the newly created schema. The server instance of the deployer application, which can be launched in a server mode using a server-mode parameter, can run continuously, waiting for requests from applications.

FIG. 1 is a block diagram illustrating an example of a system 100 for deploying content for a static service instance, according to an implementation of the present disclosure. For an application 102, an application router 103 can route application requests from clients 104 (including a client 104*a*) to application modules 106*a*, 106*b*, and 106*c*. A deploy service 108 can deploy the application 102, with the deployment including creation of a main (static) database container 110 in a database 112. The main database container 110 can be or include a database schema, for example, or some other type of service instance. The main database container 110 can be statically bound to the application 102 for the lifetime of the application 102. As part of application deployment, the deploy service 108 can create a one-off instance 113 of a deployer application for deploying artifacts that are included in the one-off instance to the main database container 110.

The one-off instance 113 of the deployer application can execute a deployment process that includes creation of a schema in the main database container 110 (as illustrated by a deploy indicator 114). The one-off instance 113 of the deployer application can statically deploy metadata descriptions of artifacts (for example, tables, views, stored procedures) after the schema is created. The one-off instance 113 of the deployer application (or another component in the database 112) can use the metadata descriptions for creation of the artifacts in the main database container 110. The one-off instance 113 of the deployer application can be terminated after the deployment process has completed.

The application modules 106*a*, 106*b*, and 106*c* can access the main database container 110, as part of application execution, as indicated by request messages 115*a*, 115*b*, and 115*c*, respectively. Credentials for accessing the main database container 110 can be provided to the application, for example, in environment variables when the application 102 is started. The application 102 is statically bound to the main database container 110 during the lifetime of the application 102.

Figure 2:
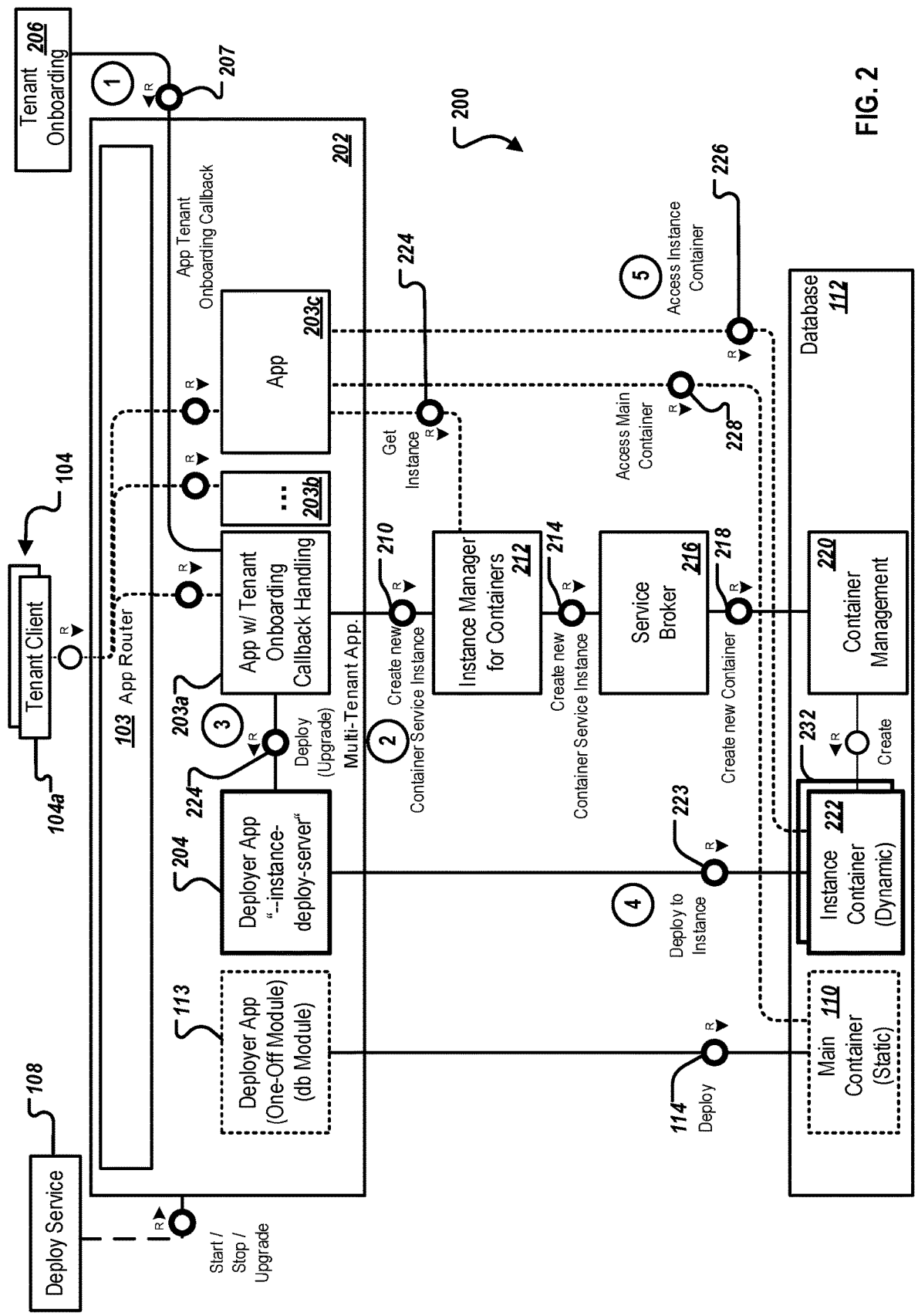
FIG. 2 is a block diagram illustrating an example of a system for deploying content for a new service instance, according to an implementation of the present disclosure.

FIG. 2 is a block diagram illustrating an example of a system 200 for deploying content for a new service instance, according to an implementation of the present disclosure. A multi-tenant application 202 can include application modules 203a, 203b, and 203c. Tenant-independent data for the multi-tenant application 202 can be stored in the main database container 110. The one-off instance 113 of the deployer application can deploy content to the main database container 110, as previously described. Separate, other database containers can be created for individual tenants, as described in the following.

The deploy service 108 can deploy a server instance 204 of the deployer application. The server instance 204 of the deployer application can be launched in a server mode using a server-mode parameter (in some implementations, "—instance—deploy server"), and can run continuously, waiting for requests from applications. The server instance 204 and the one-off instance 113 of the deployer application can have a same binary executable file, but can deploy different content.

The server instance 204 of the deployer application can deploy content in response to an onboarding request. For example, as illustrated in a first stage (1), a tenant onboarding component 206 can send an onboarding request message 207 for a new tenant to the application module 203a. The new tenant can be a new subscriber to the multi-tenant application 202, for example. The application module 203a can include a callback function that is called to handle the onboarding request message 207. The callback function may be associated with a URL that was previously registered with the system 200. Although illustrated as separate components, in some implementations, the application module 203a and the server instance 204 of the deployer application are different portions of a same application.

In a second stage (2), the application module 203a sends a message 210 to an instance manager 212 to request creation of a new container for the new tenant and a service binding for the new container. The instance manager 212 forwards the message 210 (as a forwarded message 216) to a service broker 216 to request a new container including service binding. The service broker 216, in response to receipt of the forwarded message 214, sends a container creation and service binding request 218 to a container management component 220. The container management component 220 creates a new instance container 222 for the new tenant. The instance manager 212 can return, to the application module 203a, credentials for accessing the new instance container 222.

In a third stage (3), the application module 208a sends a deployment request 224 to the server instance 204 of the deployer application, to deploy content to the new instance container 222. In some implementations, the deployment request 224 includes the credentials the application module 203a received from the instance manager 212, for accessing the new instance container 222. In other implementations, the server instance 204 of the deployer application requests and receives credentials for accessing the new service instance container 222 from the instance manager 212.

In a fourth stage (4), in response to the deployment request 224, the server instance 204 of the deployer application deploys content to the new instance container 222, as illustrated by a deployment indicator 223. The application module 208a can be provided an indication of success or failure of the deployment.

In a fifth stage (5), application module(s) access database containers. For example, the application module 203c can send a get-instance request 224 to the instance manager 212, to get a service binding for the new instance container 222. The application module 203c can use the received service binding to access the new instance container 222, as illustrated by an access request 226. The application module 203c (and other application modules) can also access the main database container 110 (for example, to access tenant-independent data), as illustrated by an access request 228. The application module 203c may have previously received a service binding for the main database container 110 from the instance manager 212, for example.

The server instance 204, after deploying content to the new service instance 222, remains active, listening for other deployment requests. For example, another new tenant can be onboarded, and another new instance container 230 can be created. The server instance 204 can receive a request (not illustrated) to deploy content to the other new service instance container 230.

When a tenant offboards (for example, is no longer associated with the multi-tenant application 202), the instance manager 212 can delete the instance container for the offloaded tenant. Deletion of the instance container can include deletion of artifacts that had been deployed by the server instance 204.

Having the server instance 204 of the deployer application deploy the artifacts, rather than the multi-tenant application 202, can result in several advantages. As previously discussed, the server instance 204 of the deployer application can have a same, common binary executable as the one-off instance 113 of the deployer application. Each of the server instance 204 and the one-off instance 113 can be referred to as database modules. The deployment to instance containers by the server instance 204 can utilize the same functionality provided by the common binary executable as used by the one-off instance 113, such as grantor services, service bindings, configuration file templating, and reusable database modules. Using the same binary executable can result in a same or similar development experience for developers, which may not be the case if the multi-tenant application 202 were to be used to deploy the artifacts. Developers may be familiar with particular database module folders common to the server instance 204 and the one-off instance 113 (for example, "lib", "src", and "cfg" folders), and such familiarity may make packaging design time artifacts into the server instance 204 an easier and more consistent process for developers than if design time artifacts were packaged into the multi-tenant application 202.

Having the instance manager 212 create a new service instance for a new tenant and the server instance 204 of the deployer application deploy content to the new instance for the new tenant can help implement multi-tenancy for the multi-tenant application 202. The multi-tenant application 202 can employ a one tenant per instance approach, or can use other tenant separation approaches. The multi-tenant application 202 can use different tenant separation approaches in different contexts, for example. Different tenants can be mapped to a same instance, for example, with a tenant column used to separate data between the tenants in the instance. Metadata that describes which tenants are mapped to which instances can be stored in the main database container 110.

An example of the use of different tenant separation approaches for one multi-tenant application can be that tenants with different capacity requirements are supported in a cost-effective way. Production tenants (for which customers pay money) can be represented in separate database containers. Trial tenants (which can be allocated for free to trial users) can be represented by a discriminative column in a database table which lives within one database container hosting all trial tenants. This can be more cost effective for a provider (for example, SAP) because trial tenants generally have limited storage capacity and can be bundled within one database container.

The system 100 can support different application lifetime phases. Changes to database artifacts (for example, tables, views, stored procedures) can change during the lifetime of the multi-tenant application 202. For example, tables, views, or stored procedures can be changed, added, or dropped. The deploy service 108 can deploy new or changed artifacts to the main container 110.

Different approaches can be used to deploy new or changed artifacts to the instance container 222 and the instance container 232. Although two instance containers are illustrated (indicating that there can be multiple boxes of type—instance container (dynamiuc)), the database 112 can include more than two instance containers. As an example, in a first approach, a new server instance of the deployer application (not illustrated) that includes the new or changed artifacts can be deployed. The new server instance of the deployer application can have an upgrade task that is configured to loop over existing instance containers and deploy, in turn, the new or changed artifacts to each respective instance container. The upgrade task can be configured to request and receive from the instance manager 212 a list of active instance containers.

The deploy service 108 can determine, during an upgrade of the multi-tenant application 202, that the new server instance of the deployer application includes different artifacts than the server instance 204, and in response to the determination, start the upgrade task. After the upgrade task has completed, the deploy service 108 can start the new server instance of the deployer application in a server mode.

The first approach can be unacceptable for some upgrades since, with the first approach, the multi-tenant application 202 may be unavailable during the upgrade, and upgrading all of the instance containers during the upgrade of the multi-tenant application 202 may result in the upgrade of the multi-tenant application 202 taking more than an acceptable amount of time. Rather than upgrade all instance containers during the upgrade of the multi-tenant application 202, instance containers can be updated using a stepwise per-instance approach.

With the stepwise approach, instance containers can be upgraded one a time, according to a schedule, or on demand by customers during a particular available upgrade window. For example, each tenant can choose to upgrade at a particular time within a two week upgrade period. The new server instance of the deployer application can determine that a particular instance container is to be upgraded (based on a schedule or based on receiving a request to upgrade the particular instance container). The new server instance of the deployer application can connect to the particular instance container and deploy new or changed artifacts to the particular instance container. A next instance container can be selected for upgrading, based on a schedule, or based on a received request to upgrade a particular tenant.

With the stepwise approach, some instance containers can be at a new version while other instance containers that have not yet been upgraded can be at a current version. To support having instance containers at different versions at a particular point in time, two versions of the multi-tenant application 202 can be simultaneously deployed—a current version and a new version. Application modules that are at the new version can connect to instance containers that have been upgraded to the new version. Concurrently, application modules that are at the current version can connect to instance containers that are at the current version, for tenants that have not yet been upgraded. Eventually, all instance containers can be upgraded to the new version and accessed by application modules that are at the new version.

FIG. 3 is an example descriptor file 300 that describes modules associated with a multi-tenant application. A section 302 describes an application module 303 of the multi-tenant application. The application module 303 is named "nodel", has a type of "nodejs", has a path of "nodel", and has dependencies on an instance manager 304 named "instance-manager-for-instance-hdi-containers" (described in a section 306) and on an Application Programming Interface (API) named "instance-deploy-server-api" that is provided by a deployer application instance 308 (described in a section 310). The application module 303 can correspond to the previously-discussed application module 208a.

The section 306 describes the instance manager 304. The section 306 specifies the name ("instance-manager-for-instance-hdi-containers") and a type ("com.corp.xs.managed-hdi-container) of the instance manager 304. The type of the instance manager 304 is a unique identifier, for example, a domain name. In some implementations, a domain name can be reversed to help establish uniqueness. The instance manager 304 can correspond to the previously-discussed instance manager 212.

The section 310 describes the deployer application instance 308. The section 310 specifies that the deployer application instance 308 provides the API named "instance-deploy-server-api". The "instance-deploy-server-api" API can include a deploy interface, which can be called by the application module 303, to deploy to a service instance for a new tenant. The section 310 also specifies a name ("instance_db"), a type ("nodejs"), and a path ("instance_db") for the deployer application instance 308. The deployer application instance 308 can be started in a server mode and can correspond to the previously-discussed server instance 204.

A section 312 describes a deployer application instance 314. The deployer application instance 314 can correspond to the previously-described one-off instance 113. The deployer application instance 314 can deploy content to a main container 316. A section 318 describes the main container 316. The main container 316 can correspond to the previously-discussed main container 111. A section 320 describes another application module 322 of the multi-tenant application. The application module 322 can correspond to the previously discussed application module 208b.

Figure 4:
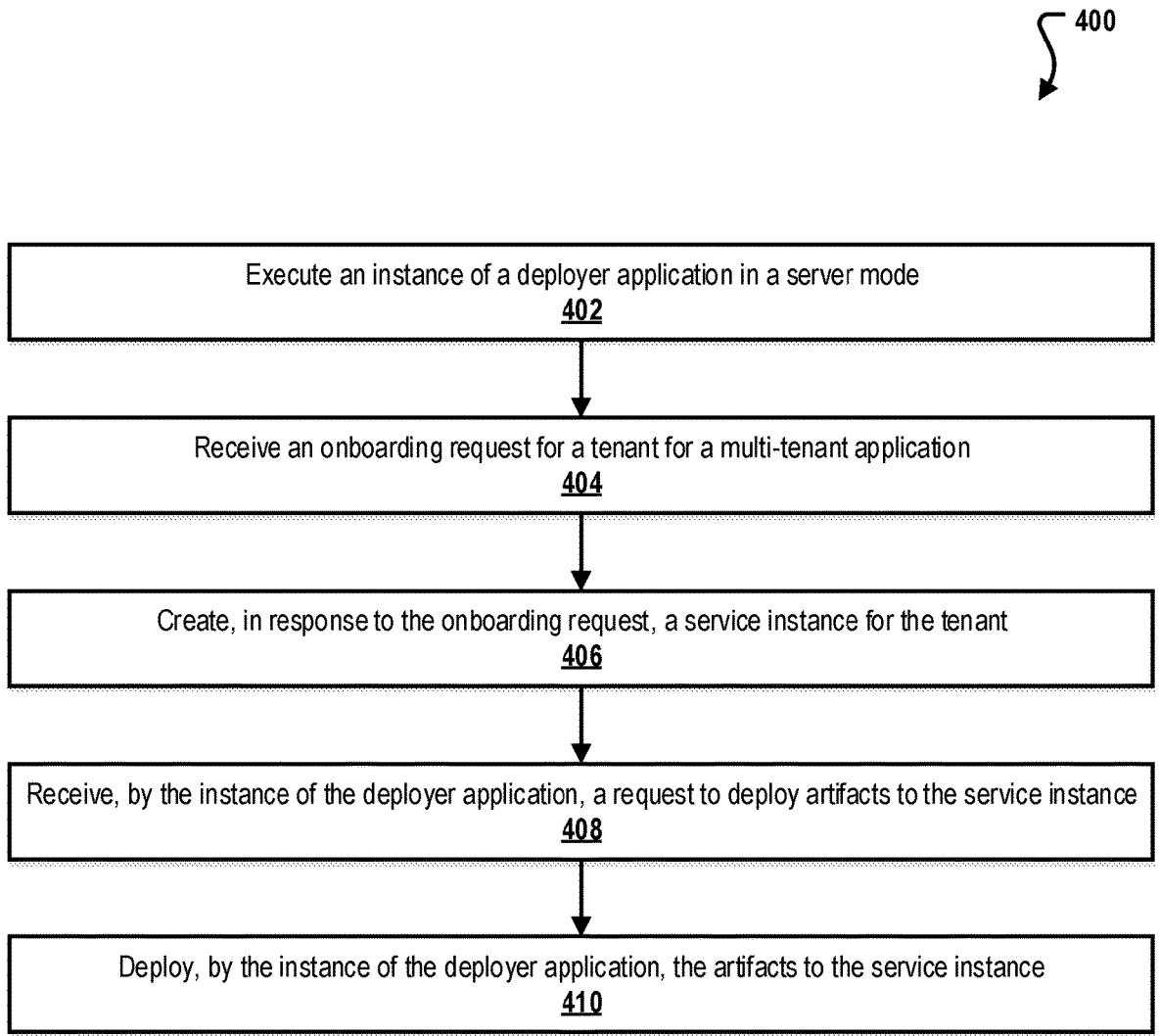
FIG. 4 is a flowchart illustrating an example of a computer-implemented method for deploying content for a new service instance, according to an implementation of the present disclosure.

FIG. 4 is a flowchart illustrating an example of a computer-implemented method 400 for artifact deployment for application managed service instances, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402 an instance of a deployer application is executed in a server mode. The deployer application is configured to deploy service instances for a multi-tenant application. Service instances deployed by the instance of the deployer application executed in the server mode can deploy content to service instances that are each associated with a specific tenant. Another instance of the deployer application can run in a run-once mode, for deploying tenant-independent data to a service instance accessible by all tenants of the multi-tenant application. From 402, method 400 proceeds to 404.

At 404, an onboarding request is received for a tenant for the multi-tenant application. The tenant may wish to subscribe to the multi-tenant application as a new tenant, for example. From 404, method 400 proceeds to 406.

At 406, a service instance is created, for the tenant, in response to the onboarding request. The service instance can be a container that is to include a database schema, for example. From 406, method 400 proceeds to 408.

At 408, a request to deploy artifacts to the service instance is received by the instance of the deployer application. The artifacts can include database tables, views, and stored procedures. The artifacts can be included in the instance of the deployer application. From 408, method 400 proceeds to 410.

At 410, the artifacts are deployed to the service instance by the instance of the deployer application. After 420, method 400 stops. In some implementations, the instance of the deployer application can continue to run in the server mode, and steps 404 to 410 can be repeated, in response to other onboarding requests received for other tenants.

Figure 5:
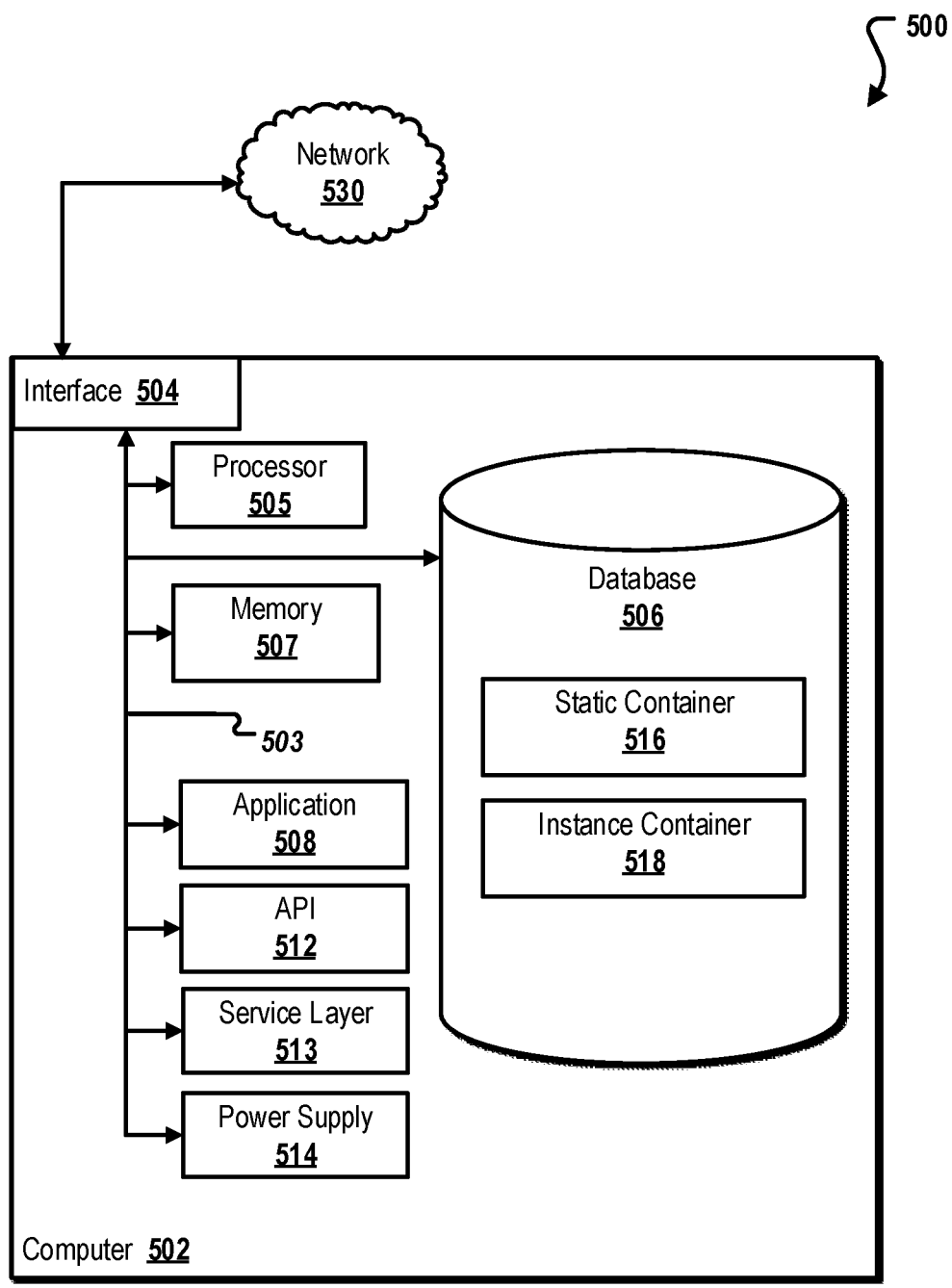
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, System 500 includes a Computer 502 and a Network 530.

The illustrated Computer 502 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 502 can include an input device, such as a keypad, keyboard, touch screen, another input device, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as a client, network component, a server, a database or another persistency, another role, or a combination of roles for performing the subject matter described in the present disclosure. The illustrated Computer 502 is communicably coupled with a Network 530. In some implementations, one or more components of the Computer 502 can be configured to operate within an environment, including cloud-computing-based, local, global, another environment, or a combination of environments.

At a high level, the Computer 502 is an electronic computing device operable to receive, transmit, process, store, or manage data and information associated with the described subject matter. According to some implementations, the Computer 502 can also include or be communicably coupled with a server, including an application server, e-mail server, web server, caching server, streaming data server, another server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory, conventional, or another type of database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. As illustrated, the Database 506 holds the previously described Static Container 516 and at least one Instance Container 518.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: executing a first instance of a deployer application in a server mode, the deployer application configured to deploy service instances for a multi-tenant application; receiving a first onboarding request for a first tenant for the multi-tenant application; creating, in response to the first onboarding request, a first service instance for the first tenant; receiving, by the first instance of the deployer application, a first request to deploy artifacts to the first service instance; and deploying, by the first instance of the deployer application, the artifacts to the first service instance The foregoing and other described implementations can each, optionally, include one or more of the following features:

A first feature, combinable with any of the following features, wherein the first service instance comprises a database schema.

A second feature, combinable with any of the previous or following features, wherein the first service instance comprises a database container.

A third feature, combinable with any of the previous or following features, wherein the artifacts comprise tables, views, and stored procedures.

A fourth feature, combinable with any of the previous or following features, wherein the artifacts are stored in the first instance of the deployer application.

A fifth feature, combinable with any of the previous or following features, comprising: executing a second instance of the deployer application to deploy shared artifacts to a shared service instance, wherein the shared service instance is accessible to each tenant of the multi-tenant application; and ending execution of the second instance of the deployer application after the shared artifacts have been deployed to the shared service instance.

A sixth feature, combinable with any of the previous or following features, wherein execution of the second instance of the deployer application finishes before the first instance of the deployer application is executed.

A seventh feature, combinable with any of the previous or following features, comprising: receiving a second onboarding request for a second tenant for the multi-tenant application; creating, in response to the second onboarding request, a second service instance for the second tenant; receiving, by the first instance of the deployer application, a second request to deploy the artifacts to the second service instance; and deploying, by the first instance of the deployer application, the artifacts to the second service instance.

In a second implementation, a non-transitory, computer-readable medium storing one or more instructions executable by a computer system to perform operations comprising: executing a first instance of a deployer application in a server mode, the deployer application configured to deploy service instances for a multi-tenant application; receiving a first onboarding request for a first tenant for the multi-tenant application; creating, in response to the first onboarding request, a first service instance for the first tenant; receiving, by the first instance of the deployer application, a first request to deploy artifacts to the first service instance; and deploying, by the first instance of the deployer application, the artifacts to the first service instance The foregoing and other described implementations can each, optionally, include one or more of the following features:

A first feature, combinable with any of the following features, wherein the first service instance comprises a database schema.

A second feature, combinable with any of the previous or following features, wherein the first service instance comprises a database container.

A third feature, combinable with any of the previous or following features, wherein the artifacts comprise tables, views, and stored procedures.

A fourth feature, combinable with any of the previous or following features, wherein the artifacts are stored in the first instance of the deployer application.

A fifth feature, combinable with any of the previous or following features, comprising: executing a second instance of the deployer application to deploy shared artifacts to a shared service instance, wherein the shared service instance is accessible to each tenant of the multi-tenant application; and ending execution of the second instance of the deployer application after the shared artifacts have been deployed to the shared service instance.

A sixth feature, combinable with any of the previous or following features, wherein execution of the second instance of the deployer application finishes before the first instance of the deployer application is executed.

A seventh feature, combinable with any of the previous or following features, comprising: receiving a second onboarding request for a second tenant for the multi-tenant application; creating, in response to the second onboarding request, a second service instance for the second tenant; receiving, by the first instance of the deployer application, a second request to deploy the artifacts to the second service instance; and deploying, by the first instance of the deployer application, the artifacts to the second service instance.

In a third implementation, a computer-implemented system, comprising: a computer memory; and a hardware processor interoperably coupled with the computer memory and configured to perform operations comprising: executing a first instance of a deployer application in a server mode, the deployer application configured to deploy service instances for a multi-tenant application; receiving a first onboarding request for a first tenant for the multi-tenant application; creating, in response to the first onboarding request, a first service instance for the first tenant; receiving, by the first instance of the deployer application, a first request to deploy artifacts to the first service instance; and deploying, by the first instance of the deployer application, the artifacts to the first service instance The foregoing and other described implementations can each, optionally, include one or more of the following features:

A first feature, combinable with any of the following features, wherein the first service instance comprises a database schema.

A second feature, combinable with any of the previous or following features, wherein the first service instance comprises a database container.

A third feature, combinable with any of the previous or following features, wherein the artifacts comprise tables, views, and stored procedures.

A fourth feature, combinable with any of the previous or following features, wherein the artifacts are stored in the first instance of the deployer application.

A fifth feature, combinable with any of the previous or following features, comprising: executing a second instance of the deployer application to deploy shared artifacts to a shared service instance, wherein the shared service instance is accessible to each tenant of the multi-tenant application; and ending execution of the second instance of the deployer application after the shared artifacts have been deployed to the shared service instance.

A sixth feature, combinable with any of the previous or following features, wherein execution of the second instance of the deployer application finishes before the first instance of the deployer application is executed.

A seventh feature, combinable with any of the previous or following features, comprising: receiving a second onboarding request for a second tenant for the multi-tenant application; creating, in response to the second onboarding request, a second service instance for the second tenant; receiving, by the first instance of the deployer application, a second request to deploy the artifacts to the second service instance; and deploying, by the first instance of the deployer application, the artifacts to the second service instance.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order illustrated or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   executing a first instance of a deployer application in a non-server mode to deploy shared artifacts to a shared service instance, wherein the shared service instance is accessible to each tenant of a multi-tenant application;
   ending execution of the first instance of the deployer application after the shared artifacts have been deployed to the shared service instance;
   executing a second instance of the deployer application in a server mode, wherein the second instance of the deployer application is configured to deploy tenant-specific artifacts for the multi-tenant application;
   receiving a first onboarding request for a first tenant for the multi-tenant application;
   creating, in response to the first onboarding request, a first service instance for the first tenant;
   receiving, by the second instance of the deployer application, a first request to deploy tenant-specific artifacts to the first service instance; and
   deploying, by the second instance of the deployer application, the tenant-specific artifacts to the first service instance.

2. The computer-implemented method of claim 1, wherein the first service instance comprises a database schema.

3. The computer-implemented method of claim 1, wherein the first service instance comprises a database container.

4. The computer-implemented method of claim 1, wherein the tenant-specific artifacts comprise tables, views, and stored procedures.

5. The computer-implemented method of claim 1, wherein the tenant-specific artifacts are stored in the first instance of the deployer application.

6. The computer-implemented method of claim 1, wherein execution of the first instance of the deployer application finishes before the second instance of the deployer application is executed.

7. The computer-implemented method of claim 1, comprising:
- receiving a second onboarding request for a second tenant for the multi-tenant application;
- creating, in response to the second onboarding request, a second service instance for the second tenant;
- receiving, by the second instance of the deployer application, a second request to deploy the tenant-specific artifacts to the second service instance; and
- deploying, by the second instance of the deployer application, the tenant-specific artifacts to the second service instance.

8. A non-transitory, computer-readable medium storing one or more instructions executable by a computer system to perform operations comprising:
- executing a first instance of a deployer application in a non-server mode to deploy shared artifacts to a shared service instance, wherein the shared service instance is accessible to each tenant of a multi-tenant application;
- ending execution of the first instance of the deployer application after the shared artifacts have been deployed to the shared service instance;
- executing a second instance of the deployer application in a server mode, wherein the second instance of the deployer application is configured to deploy tenant-specific artifacts for the multi-tenant application;
- receiving a first onboarding request for a first tenant for the multi-tenant application;
- creating, in response to the first onboarding request, a first service instance for the first tenant;
- receiving, by the second instance of the deployer application, a first request to deploy tenant-specific artifacts to the first service instance; and
- deploying, by the second instance of the deployer application, the tenant-specific artifacts to the first service instance.

9. The non-transitory, computer-readable medium of claim 8, wherein the first service instance comprises a database schema.

10. The non-transitory, computer-readable medium of claim 8, wherein the first service instance comprises a database container.

11. The non-transitory, computer-readable medium of claim 8, wherein the tenant-specific artifacts comprise tables, views, and stored procedures.

12. The non-transitory, computer-readable medium of claim 8, wherein the tenant-specific artifacts are stored in the first instance of the deployer application.

13. A computer-implemented system, comprising:
- one or more computers; and
- one or more computer memory devices interoperably coupled with the one or more computers and having tangible, non-transitory, machine-readable media storing one or more instructions that, when executed by the one or more computers, perform one or more operations comprising:
- executing a first instance of a deployer application in a non-server mode to deploy shared artifacts to a shared service instance, wherein the shared service instance is accessible to each tenant of a multi-tenant application;
- ending execution of the first instance of the deployer application after the shared artifacts have been deployed to the shared service instance;
- executing a second instance of the deployer application in a server mode, wherein the second instance of the deployer application is configured to deploy tenant-specific artifacts for the multi-tenant application;
- receiving a first onboarding request for a first tenant for the multi-tenant application;
- creating, in response to the first onboarding request, a first service instance for the first tenant;
- receiving, by the second instance of the deployer application, a first request to deploy tenant-specific artifacts to the first service instance; and
- deploying, by the second instance of the deployer application, the tenant-specific artifacts to the first service instance.

14. The computer-implemented system medium of claim 13, wherein the first service instance comprises a database schema.

15. The computer-implemented system of claim 13, wherein the first service instance comprises a database container.

16. The computer-implemented system of claim 13, wherein the tenant-specific artifacts comprise tables, views, and stored procedures.

17. The computer-implemented system of claim 13, wherein the tenant-specific artifacts are stored in the first instance of the deployer application.

* * * * *